United States Patent
Patel et al.

(10) Patent No.: US 11,946,344 B2
(45) Date of Patent: Apr. 2, 2024

(54) SEQUESTRATION OF CARBON IN SALINE AQUIFERS

(71) Applicant: Saudi Arabian Oil Company, Dhahran (SA)

(72) Inventors: Hasmukh A. Patel, Katy, TX (US); Katherine Leigh Hull, Houston, TX (US); Younane N. Abousleiman, Norman, OK (US); Rajesh Goteti, Katy, TX (US); David Jacobi, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/865,017

(22) Filed: Jul. 14, 2022

(65) Prior Publication Data
US 2024/0018849 A1    Jan. 18, 2024

(51) Int. Cl.
E21B 41/00    (2006.01)
C09K 8/64    (2006.01)
E21B 43/26    (2006.01)

(52) U.S. Cl.
CPC ............ E21B 41/0064 (2013.01); C09K 8/64 (2013.01); E21B 43/26 (2013.01)

(58) Field of Classification Search
CPC ........ E21B 41/0064; E21B 43/26; C09K 8/64
See application file for complete search history.

(56) References Cited

U.S. PATENT DOCUMENTS

| | | | |
|---|---|---|---|
| 7,077,199 B2 | 7/2006 | Vinegar et al. | |
| 8,002,498 B2 | 8/2011 | Leone et al. | |
| 8,899,331 B2 | 12/2014 | Burnham | |
| 9,291,541 B2 | 3/2016 | Kim et al. | |
| 9,714,406 B2 | 7/2017 | Constantz et al. | |
| 10,351,758 B2 | 7/2019 | Hull et al. | |
| 10,871,061 B2 | 12/2020 | Hull et al. | |
| 11,078,406 B2 | 8/2021 | Hull et al. | |
| 2006/0185985 A1* | 8/2006 | Jones ................ | B01D 53/1418 423/220 |
| 2008/0006410 A1 | 1/2008 | Looney et al. | |

(Continued)

FOREIGN PATENT DOCUMENTS

JP    5347154    11/2013

OTHER PUBLICATIONS

U.S. Appl. No. 17/107,428, Hull et al., filed Nov. 30, 2020.

(Continued)

*Primary Examiner* — Silvana C Runyan
(74) *Attorney, Agent, or Firm* — Fish & Richardson P.C.

(57) ABSTRACT

A method for subsurface sequestration of carbon includes injecting a treatment composition comprising a mineralization accelerant into a subterranean zone at least partially saturated with saline water. The mineralization accelerant is reactive with carbon dioxide to form bicarbonate. The method further includes injecting carbon in the form of carbon dioxide into the subterranean zone and sequestering at least a portion of the carbon in the subterranean zone by precipitation in the subterranean zone of a carbonate mineral formed from reaction of the bicarbonate with metal cations dissolved in the saline water. At least a portion of the bicarbonate is formed by reaction of the mineralization accelerant with the carbon dioxide.

18 Claims, 8 Drawing Sheets

(56) References Cited

U.S. PATENT DOCUMENTS

| | | | |
|---|---|---|---|
| 2011/0014100 A1* | 1/2011 | Bara | B01D 53/62 |
| | | | 423/437.1 |
| 2012/0291675 A1* | 11/2012 | Camire | C04B 14/26 |
| | | | 423/220 |
| 2015/0096755 A1* | 4/2015 | Martucci | C09K 8/594 |
| | | | 166/305.1 |
| 2017/0066959 A1 | 3/2017 | Hull et al. | |
| 2019/0211658 A1 | 7/2019 | Hull et al. | |
| 2021/0024808 A1 | 1/2021 | Schipper et al. | |
| 2021/0024814 A1 | 1/2021 | Schipper et al. | |
| 2021/0198558 A1 | 7/2021 | Hull et al. | |
| 2021/0198559 A1 | 7/2021 | Hull et al. | |
| 2021/0222055 A1 | 7/2021 | Schipper et al. | |
| 2023/0183558 A1 | 6/2023 | Hull et al. | |

OTHER PUBLICATIONS

U.S. Appl. No. 63/289,308, Hull et al., filed Dec. 14, 2021.

"Polk Station Fact Sheet: Carbon Dioxide Capture and Storage Project," Polk Station Fact Sheet, 2016, 2 pages.

Arti et al., "Single Process for CO2 Capture and Mineralization in Various Alkanolamines Using Calcium Chloride," Energy Fuels 2017, 31, 1, 763-769, 7 pages.

Ayayi et al., "A review of CO2 storage in geological formations emphasizing modeling, monitoring and capacity estimation approaches," Petroleum Science, 2019, 16:1028-1063, 36 pages.

Global Status of CCS Report, Dec. 11, 2020, Global CCS Institute, 44 pages.

Goeppert et al., "Air as the renewable carbon source of the future: an overview of CO2 capture from the atmosphere," Energy Environ. Sci., 2012, 5: 7833, 12 pages.

Hassanzadeh et al., "Accelerating CO2 Dissolution in Saline Aquifers for Geological Storage," Energy & Fuels, 2009, 23, 3328-3336, 9 pages.

Hepburn et al., "The technological and economic prospects for CO2 utilization and removal," Nature, Nov. 2019, 575, 11 pages.

Hull et al., "Chemomechanical Effects of Oxidizer-CO2 Systems Upon Hydraulically Fractured Unconventional Source Rock," Canadian Journal of Chemical Engineering, 2021, 26 pages.

Hull et al., "Oxidative Kerogen Degradation: A Potential Approach to Hydraulic Fracturing in Unconventionals," Energy Fuels, 2019, 33: 4758-4766, 8 pages.

Hull et al., "Synthesis and structural characterization of CO2-soluble oxidizers [Bu4N]BrO3 and [Bu4N]ClO3 and their dissolution in cosolvent-modified CO2 for reservoir applications," RSC Advances, Royal Society of Chemistry, Dec. 21, 2020, 10: 44973, 8 pages.

Hur et al., "Reactive force fields for modeling oxidative degradation of organic matter in geological formations," Sep. 1, 2021.

Kumar et al., "Effect of brine salinity on the geological sequestration of CO2 in a deep saline carbonate formation," Greenhouse Gas Sci Technol., Feb. 2020, 10:296-312, 17 pages.

Majumdar et al., "Research Opportunities for CO2 Utilization and Negative Emissions at the Gigatonne Scale," Joule, 2, 801-809, May 2018, 5 pages.

Patel et al., "Carbon Dioxide Capture Adsorbents: Chemistry and Methods," ChemSusChem, 2017, 10, 1303-1317, 16 pages.

Power et al., "Accelerating Mineral Carbonation Using Carbonic Anhydrase," Environ. Sci. Technol. 2016, 50, 5, 2610-2618, 31 pages.

Rahimi et al., "Toward smart carbon capture with machine learning," Cell Reports Physical Science, Apr. 2021, 2:100396.

Reeve et al., "Carbonate geochemistry and the concentrations of aqueous Mg2+, Sr2+ and Ca2+: Western north coast of the Yucatan, Mexico," Chemical Geology, Jan. 1994, 112(1-2): 105-117.

Sanna et al., "A review of mineral carbonation technologies to sequester CO2," Chem. Soc. Rev., 2014, 43, 8049, 32 pages.

Thanh et al., "Application of artificial neural network for predicting the performance of CO2 Enhanced oil recovery and storage in residual oil zones," Scientific Reports, Oct. 2020, 10:18204.

Tong et al., "Committed Emissions from Existing Energy Infrastructure Jeopardize 1.5° C Climate Target," Nature, 2019, 572(7769): 373-377, 17 pages.

Wang et al., "Impacts of mineralogical compositions on different trapping mechanisms during long-term CO2 storage in deep saline aquifers," Acta Geotechnica (2016) 11:1167-1188, 22 pages.

Wang et al., "Molecular Simulation of CO2/CH4 Competitive Adsorption on Shale Kerogen for CO2 Sequestration and Enhanced Gas Recovery," J. Phys. Chem. C, 2018, 122, 30, 17009-17018, 29 pages.

Zhang et al., "Effectiveness of amino acid salt solutions in capturing CO2: A review," Renewable and Sustainable Energy Reviews, 2018, 98: 179-188, 10 pages.

Zhang et al., "Rapid CO2 capture-to-mineralisation in a scalable reactor," React. Chem. Eng., 2020, 5, 473, 13 pages.

National Academies of Sciences, Engineering, and Medicine, "Negative Emissions Technologies and Reliable Sequestration: A Research Agenda (2019)," Washington, DC: The National Academies Press, 2019, 511 pages.

* cited by examiner

SEQUESTRATION OF CARBON IN SALINE AQUIFERS

TECHNICAL FIELD

This document relates to methods and compositions for sequestering carbon dioxide in subterranean formations.

BACKGROUND

Anthropogenic carbon dioxide emissions continue to rise steadily. Potential global climate change associated with greenhouse gas (GHG) emissions can only be mitigated by reducing atmospheric carbon levels through emissions cuts or carbon capture utilization and storage (CCUS) technologies.

The aggressive goal to reduce atmospheric carbon dioxide accumulation will be very challenging to meet without significant technological developments for CCUS. Technologies for capturing and storing carbon dioxide, including those that can be retrofitted to existing structures, will be critical to achieving the global climate change mitigation goals.

There are several challenges associated with current CCUS technologies which include cost, scalability, longevity, and other factors. Many approaches have been considered and are currently under development. These include converting carbon dioxide to chemicals or fuels or with concrete mix for building materials. Unconventional uses of carbon dioxide include enhanced weathering techniques, forestry and land management.

Underground geological sequestration may be of particular interest for CCUS due to the potential large storage capacity of geological formations and the permanence of such sequestration. In geological sequestration, carbon in the form of carbon dioxide is injected to suitable depths within the Earth wherein it can be permanently fixated. Geological formations that have shown proven potentials for carbon storage include depleted oil and gas reservoirs, saline aquifers, and unmined coal beds. Among these alternatives, saline aquifers may be favored due to their wide distribution around the world, large pore volumes, high permeability, pressure dissipation, and potential for permanent carbon mineralization

SUMMARY

This disclosure describes sequestration of carbon in subterranean formations.

Certain aspects of the subject matter herein can be implemented as a method for subsurface sequestration of carbon. The method includes injecting a treatment composition comprising a mineralization accelerant into a subterranean zone at least partially saturated with saline water. The mineralization accelerant is reactive with carbon dioxide to form bicarbonate. The method further includes injecting carbon in the form of carbon dioxide into the subterranean zone and sequestering at least a portion of the carbon in the subterranean zone by precipitation of a carbonate mineral formed from reaction of the bicarbonate with metal cations dissolved in the saline water, wherein at least a portion of the bicarbonate is formed by reaction of the mineralization accelerant with the carbon dioxide.

An aspect combinable with any of the other aspects can include the following features. The mineralization accelerant can include one or more of an amino acid, a sodium salt of an amino acid, a potassium salt of an amino acid, an alkyl amine, and an aromatic amine.

An aspect combinable with any of the other aspects can include the following features. The treatment composition can be an aqueous solution.

An aspect combinable with any of the other aspects can include the following features. The concentration of the mineralization accelerant in the aqueous solution can be equal to or greater than 0.1 percent weight-for-weight.

An aspect combinable with any of the other aspects can include the following features. The concentration of the mineralization accelerant in the aqueous solution is equal to or greater than 0.5 percent weight-for-weight.

An aspect combinable with any of the other aspects can include the following features. The concentration of the mineralization accelerant in the aqueous solution can be equal to or greater than one percent weight-for-weight.

An aspect combinable with any of the other aspects can include the following features. The mineralization accelerant, when injected into the subterranean zone, can form micelles dispersed within the saline water.

An aspect combinable with any of the other aspects can include the following features. The treatment composition and the carbon dioxide can be injected simultaneously as a mixture.

An aspect combinable with any of the other aspects can include the following features. The treatment composition and the carbon dioxide are injected sequentially.

An aspect combinable with any of the other aspects can include the following features. The treatment composition and the carbon dioxide can be injected in alternating aliquots.

An aspect combinable with any of the other aspects can include the following features. The carbon dioxide can be injected into the subterranean zone as a supercritical fluid.

An aspect combinable with any of the other aspects can include the following features. The carbon dioxide can be injected into the subterranean zone as a component of an aqueous solution.

An aspect combinable with any of the other aspects can include the following features. The saline water can have a salinity of greater than 1 percent.

An aspect combinable with any of the other aspects can include the following features. The subterranean zone can include sedimentary rock.

An aspect combinable with any of the other aspects can include the following features. The treatment composition and the carbon dioxide can be injected simultaneously as an emulsion.

An aspect combinable with any of the other aspects can include the following features. The injecting of carbon dioxide into the subterranean zone can be via one or a plurality of wells, and a total volume of all fluids injected into the subterranean zone via the one or the plurality of wells can include, on average per well per month, at least seventy weight percent carbon dioxide and less than thirty weight percent water.

An aspect combinable with any of the other aspects can include the following features. The treatment composition and the carbon dioxide can be injected simultaneously as a foam mixture.

An aspect combinable with any of the other aspects can include the following features. The injecting of carbon dioxide into the subterranean zone can be at least in part via one or a plurality of wells, and wherein a total volume of all fluids injected into the subterranean zone via the one or the plurality of wells can include, on average per well per month, at least fifty weight percent carbon dioxide and less than fifty weight percent water.

Certain aspects of the subject matter herein can be implemented as a method for subsurface sequestration of carbon that includes injecting, into a subterranean zone at least partially saturated with saline water, a treatment composition reactive with carbon dioxide to form micelles of greater density in the saline water than dissolved carbon dioxide. Carbon in the form of carbon dioxide is injected into the subterranean zone, thereby sequestering, by precipitation in the subterranean zone of a carbonate mineral formed from reaction of a bicarbonate ion of the micelles with metal cations dissolved in the saline water, at least a portion of the carbon in the subterranean zone.

An aspect combinable with any of the other aspects can include the following features. The treatment composition can be reactive with carbon dioxide to form bicarbonate, and the carbonate mineral can be formed from reaction of the bicarbonate with metal cations dissolved in the saline water.

An aspect combinable with any of the other aspects can include the following feature. The treatment composition can include an amino acid-based composition with carboxylic or amino functionalities.

Certain aspects of the subject matter herein can be implemented as a method for subsurface sequestration of carbon that includes placing micelles comprising a bicarbonate ion into a subterranean zone partially saturated with saline water by injecting into the subterranean zone an amino acid-based treatment composition having carboxylic or amino functionalities. The method further includes injecting carbon in the form of carbon dioxide into the subterranean zone, thereby sequestering at least a portion of the carbon in the subterranean zone by precipitation in the subterranean zone of a carbonate mineral formed from reaction of metal cations dissolved in the saline water with the bicarbonate ion in the micelles.

An aspect combinable with any of the other aspects can include the following feature. The micelles can have a greater density in the saline water than dissolved carbon dioxide.

The details of one or more implementations of the disclosure are set forth in the accompanying drawings and the description that follows. Other features, objects, and advantages of the disclosure will be apparent from the description and drawings, and from the claims.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Although saline aquifers are known to have exceptional carbon storage capacity in terms of their ability to sequester high volumes of carbon injected in the form of carbon dioxide, they preferably should possess a tight sealing shale cap to allow for an extended residence time, to ensure mineralization and to permanently store the carbon as stable minerals in the host geological formation. It is estimated that the carbon mineralization could occur over decades. Since the saline aquifers are highly permeable, large volumes of carbon dioxide can migrate as plumes, which can be problematic for mineralization. This constant movement can undermine the mineralization process and could extend it indefinitely. On the other hand, the constant movement of plumes as carbon dioxide is much less dense than water, thus potentially allowing the carbon dioxide to eventually find its way from the geosphere to the atmosphere without mineralization.

Most of the deep (greater than 1000 meters in depth) saline aquifers in the world are located within sedimentary basins known for their exceptional carbon storage potential, owing to their large porosity or fluid pore volume and high permeability. Upon carbon dioxide injection, carbon dioxide displaces water from the pores of saline aquifers. A reaction of the carbon dioxide into bicarbonate, and of the bicarbonate with ions in the formation fluids, allows for precipitation of minerals (carbonation) and/or dissolution of pre-existing minerals (acidification), according to following initial aqueous equilibria:

$$CO_2(g) \leftrightarrow CO_2(aq) \qquad \text{eq. 1}$$

$$CO_2 + H_2O \leftrightarrow H_2CO_3 \qquad \text{eq. 2}$$

$$H_2CO_3 \leftrightarrow HCO_3^- + \qquad \text{eq. 3}$$

$$HCO_3^- \leftrightarrow CO_3^{2-} + \qquad \text{eq. 4}$$

$$Ca^{2+} + HCO_3^- \leftrightarrow CaCO_3 + H^+ \qquad \text{eq. 5}$$

$$Mg^{2+} + HCO_3^- \leftrightarrow MgCO_3 + H^+ \qquad \text{eq. 6}$$

$$Fe^{2+} + HCO_3^- \leftrightarrow FeCO_3 + H^+ \qquad \text{eq. 7}$$

The density of carbon dioxide in saline reservoirs is observed to be 0.6-0.7 g/cm³, which is much lower than the density of formation brine waters (>1.0 g/cm³). Such a density contrast can result in carbon dioxide migration towards the cap-rock (or the sealing formation) on account of the buoyancy effects, which can reduce the opportunity for mineralization and potentially allow for carbon to escape due to upward movement through cracks, fractures, or otherwise less-than-perfect sealing of the subterranean formation. Because bicarbonate has a greater density in saline water than carbon dioxide, converting the carbon dioxide to bicarbonate can increase the residence time of the carbon in the formation. Furthermore, accelerating the kinetic rate for carbon mineralization can minimize the loss of carbon and increase the overall rate of mineralization and thus of the effectiveness and volume of carbon sequestration.

In accordance with some embodiments of the present disclosure, the challenges of accelerating the kinetics involved in sequestering and permanently capturing carbon through mineralization from carbon dioxide in saline aquifers can be addressed. A treatment composition including a mineralization accelerant is injected into a saline aquifer or other saline-water saturated subterranean zone. Carbon dioxide injected before, after, or together with the treatment composition reacts with the mineralization accelerant so as to form bicarbonate. In accordance with this method, the residence time of carbon in the saline aquifers can be increased (due to the greater density of bicarbonate relative to the saline water, as compared to carbon dioxide) and the generation of intermediate and final mineral species can be facilitated.

Figure 1:
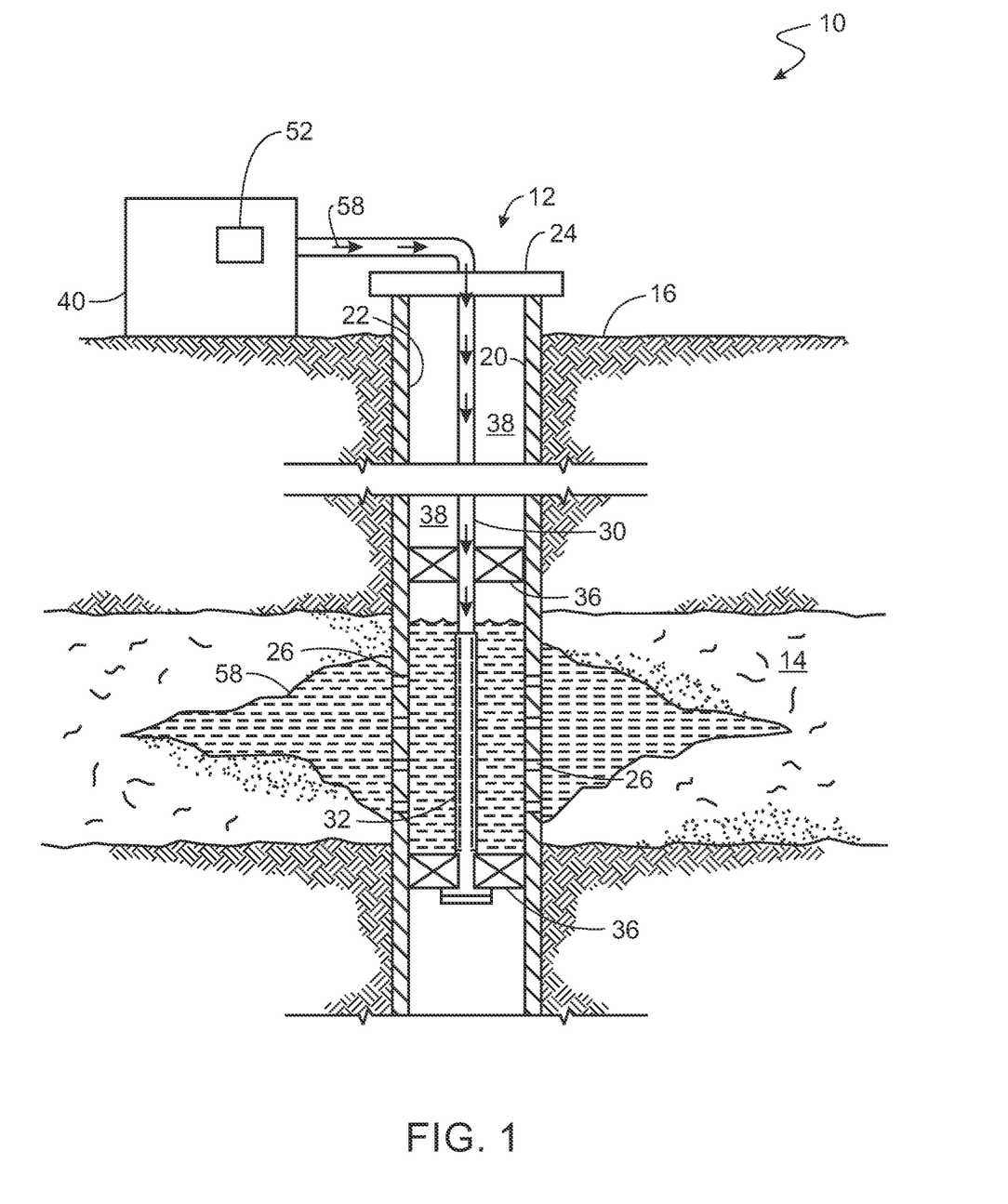
FIG. 1 is a schematic illustration of a carbon sequestration operation in accordance with an embodiment of the present disclosure.

FIG. 1 is a schematic illustration of a carbon sequestration operation 10 in accordance with an embodiment of the present disclosure, including a well 12 drilled from a surface 16 into a subterranean zone 14. Subterranean zone 14 can in some embodiments comprise an aquifer composed of a sedimentary rock such as sandstone, carbonate, clay, or combination of these rock types, at least partially saturated with saline water filling the pore spaces in the rock. In some embodiments, subterranean zone 14 can be at a depth of, for example, greater than five hundred meters from surface 16 (for example, one-thousand meters, two-thousand meters, three thousand meters, or greater). The saline water that at least partially saturates subterranean zone 14 can in some embodiments have a salinity of greater than one percent (for example, five percent, fifteen percent, twenty percent, or twenty five percent). The saline water may include dissolved metal ions such as alkaline or alkaline earth cations, transition metal ions, and other metal ions that are reactive to form carbonates. In some embodiments, the temperature of subterranean zone 14 can be greater than five degrees Celsius (for example, twenty, thirty, or sixty degrees Celsius). In some embodiments, formation pressure of subterranean zone 14 can be greater than 3 MPa (for example 7 MPa, 14 MPa, or 140 MPa).

In some implementations, the well 12 can intersect a plurality of subterranean zones or formations. In some embodiments, a sequestration operation can include a plurality of wells drilled into one or more subterranean zones or formations. The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the subterranean zone 14 to allow fluids to flow from the wellbore into the subterranean zone 14. Perforations 26 can be formed using shape charges, a perforating gun or otherwise.

For the carbon dioxide sequestration operation 10, a work string 30 can be disposed in the well bore 20. The work string 30 can be coiled tubing, sectioned pipe, or other suitable tubing. An injection tool 32 can be coupled to an end of the work string 30. Packers 36 can seal an annulus 38 of the well bore 20 above and below the subterranean zone 14. Packers 36 can be mechanical, fluid inflatable, or other suitable packers. One or more pump systems 40 can be coupled to the work string 30 at the surface 16. The pump units 40 can pump fluid compositions 58 such as treatment compositions, carbon dioxide, or other substances down the work string 30 and into subterranean zone 14. The pump units 40 can be controlled by control module 52 and can include mobile vehicles or equipment such as skids or other suitable structures.

In some embodiments of the present disclosure, and as described in greater detail below, fluid composition 58 can include carbon dioxide (in gas, liquid, or supercritical form) and can also include a treatment composition including a mineralization accelerant injected before, after, or simultaneously with the injection of carbon dioxide (which can in turn be injected in gas, liquid, or supercritical form).

Figure 2:
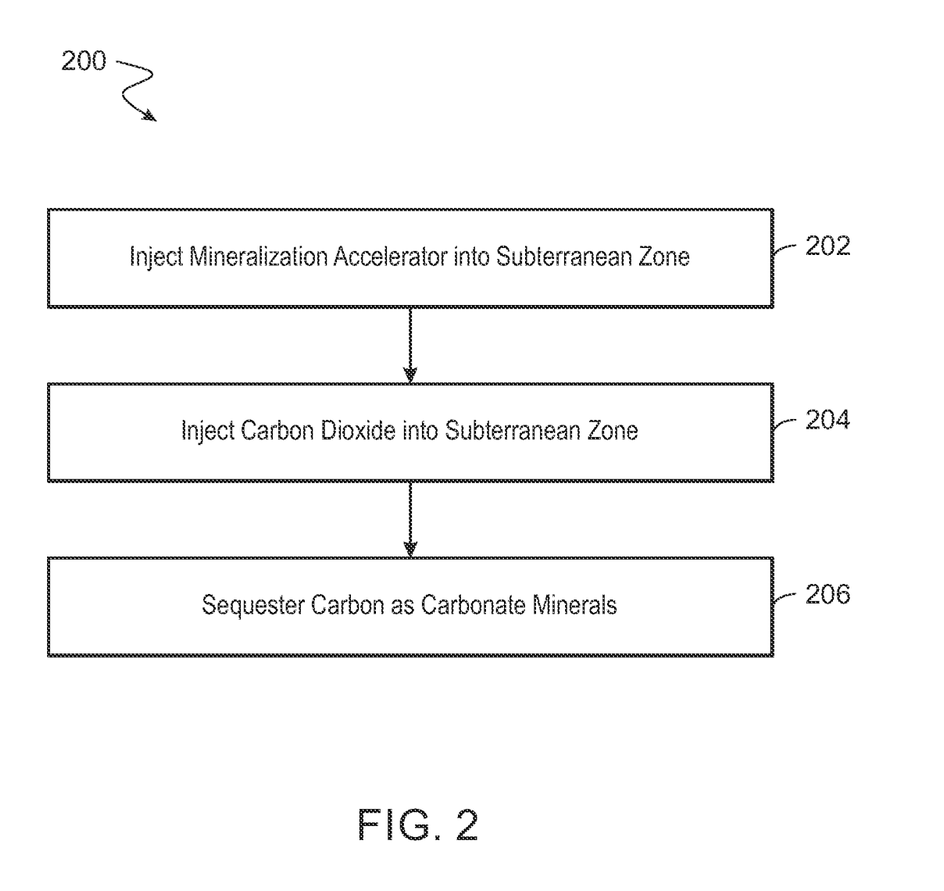
FIG. 2 is a process flow chart of an example of a method for sequestering carbon in a subterranean zone in accordance with an embodiment of the present disclosure.

FIG. 2 is a process flowchart of an example of a method 200 for subsurface sequestration of carbon. The method begins at step 202 wherein a treatment composition is injected into a subterranean zone at least partially saturated with saline water. In some embodiments, the injection can be via one or more wells (such as well 12 of sequestration operation 10 into subterranean zone 14), as described in reference to FIG. 1.

In some embodiments, the treatment composition is an aqueous solution including a mineralization accelerant reactive with carbon dioxide to form bicarbonate. Suitable mineralization accelerants can include, for example, amino acids or their sodium or potassium salts, alkyl amines, alkanolamine, aromatic amines, or a mixture of such substances. In some embodiments, the treatment composition is an aqueous solution, and the concentration of the mineralization accelerant in the aqueous solution is equal to or greater than 0.1 percent weight-for-weight (for example, 0.1%-20% w/w). In some embodiments, concentration of the mineralization accelerant in the aqueous solution is equal to or greater than 0.5 percent weight-for-weight (for example, 0.5%-10% w/w). In some embodiments, the concentration of the mineralization accelerant in the aqueous solution is equal to or greater than one percent weight-for-weight (for example, 1%-5% w/w). The treatment composition can in some embodiments mix with (and/or displace) some or all of the saline water in the subterranean zone.

Proceeding to step 204, carbon dioxide is injected into the subterranean zone via a well or wells, which, in some embodiments, can be the same wells that are used for the treatment composition injection or, in some embodiments, can be a different well or wells. The injected carbon dioxide can be in gas, liquid, or supercritical form, or in different forms mixed together or sequentially, and/or a component of an aqueous solution. In some embodiments, the treatment composition and the carbon dioxide are injected simultaneously as a mixture. In some embodiments, the treatment composition and the carbon dioxide are injected sequentially. In some embodiments, the treatment composition and the carbon dioxide are injected in alternating aliquots. In some embodiments, the carbon dioxide is injected into the subterranean zone as a component of an aqueous solution. In some embodiments, the injection rate of the treatment composition (or of the treatment composition/carbon dioxide mixture) can be from 10 to 500 barrels per hour or another suitable injection rate.

Proceeding to step 206, the carbon is sequestered in the subterranean zone in the form of carbonate minerals formed in the subterranean zone from reaction of the bicarbonate (produced by the reaction of the carbon dioxide with the mineralization accelerant) with metal ions (such as, for example, calcium, iron, or magnesium) in the saline water.

Such accelerated carbon dioxide hydration and mineralization can be expressed as follows:

$$E + CO_2 + H_2O \leftrightarrow EH^+ + HCO_3^-  \qquad \text{eq. 8}$$

$$MX + HCO_3^- \rightarrow MCO_3 + HX \qquad \text{eq. 9}$$

In the above equations, E is the mineralization accelerator (such as amino acids, monoethanolamine, piperazine-based secondary or primary amines, alkyl or aromatic amines), M is a metal ion, and X is a chloride, hydroxide, sulfate, or carbonate.

Figure 3:
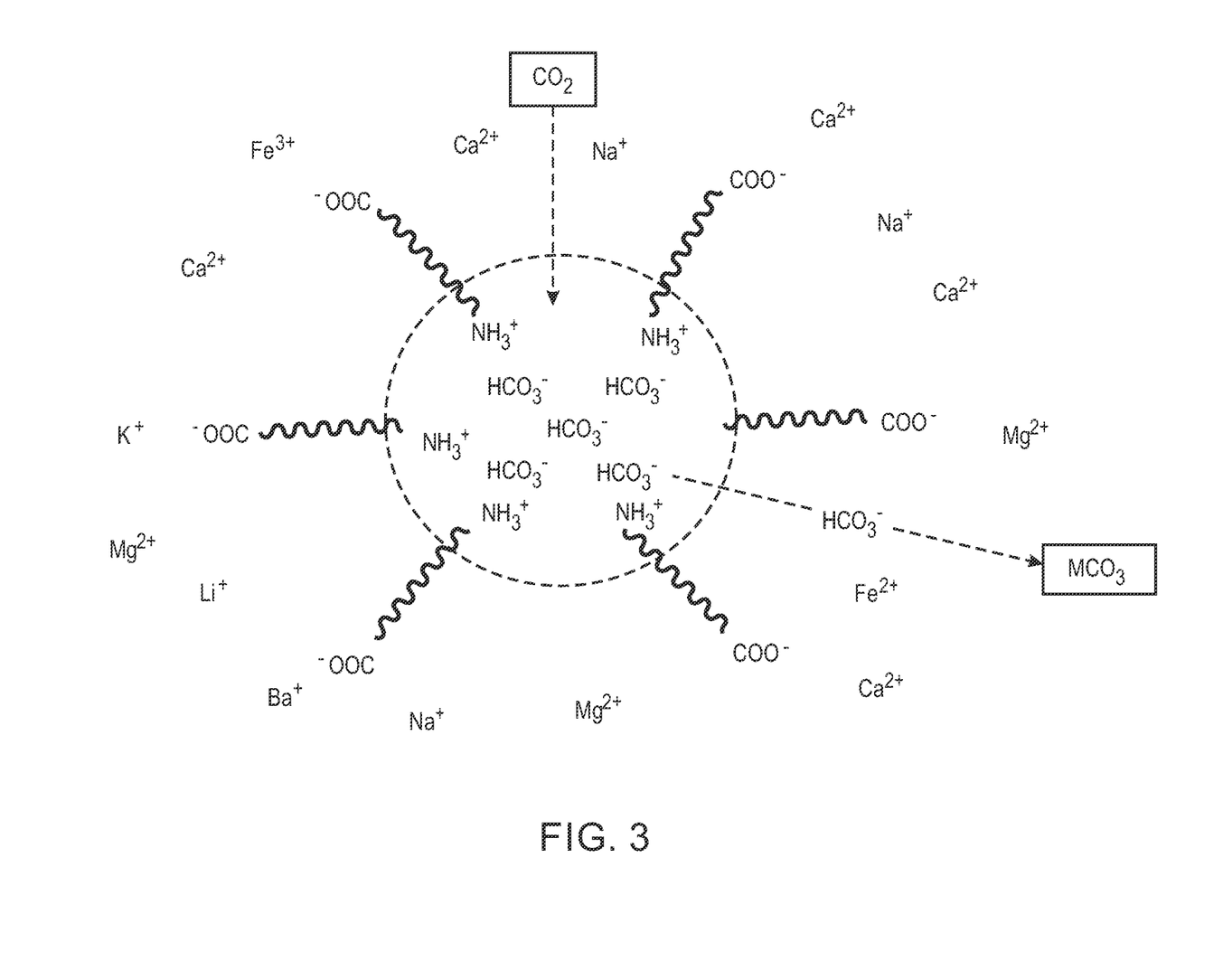
FIG. 3 shows a sub-nanometer scale mechanism of micelle formation and a route for mineral carbonation in accordance with an embodiment of the present disclosure.

In some embodiments, the accelerants can include amino acid-based compositions with carboxylic (—COOH) and amino (—NH$_2$) functionalities, which can form micelles in the saline water in the presence of injected carbon dioxide. FIG. 3 shows a sub-nanometer scale mechanism of micelle formation and the route for mineral carbonation. The micelles formed from such chemical moieties can have a greater density than carbon dioxide in the saline water and therefore can provide for longer residence time of the dissolved carbon species, further facilitating subsequent mineralization with available metal ions in the saline aquifers.

Figure 4:
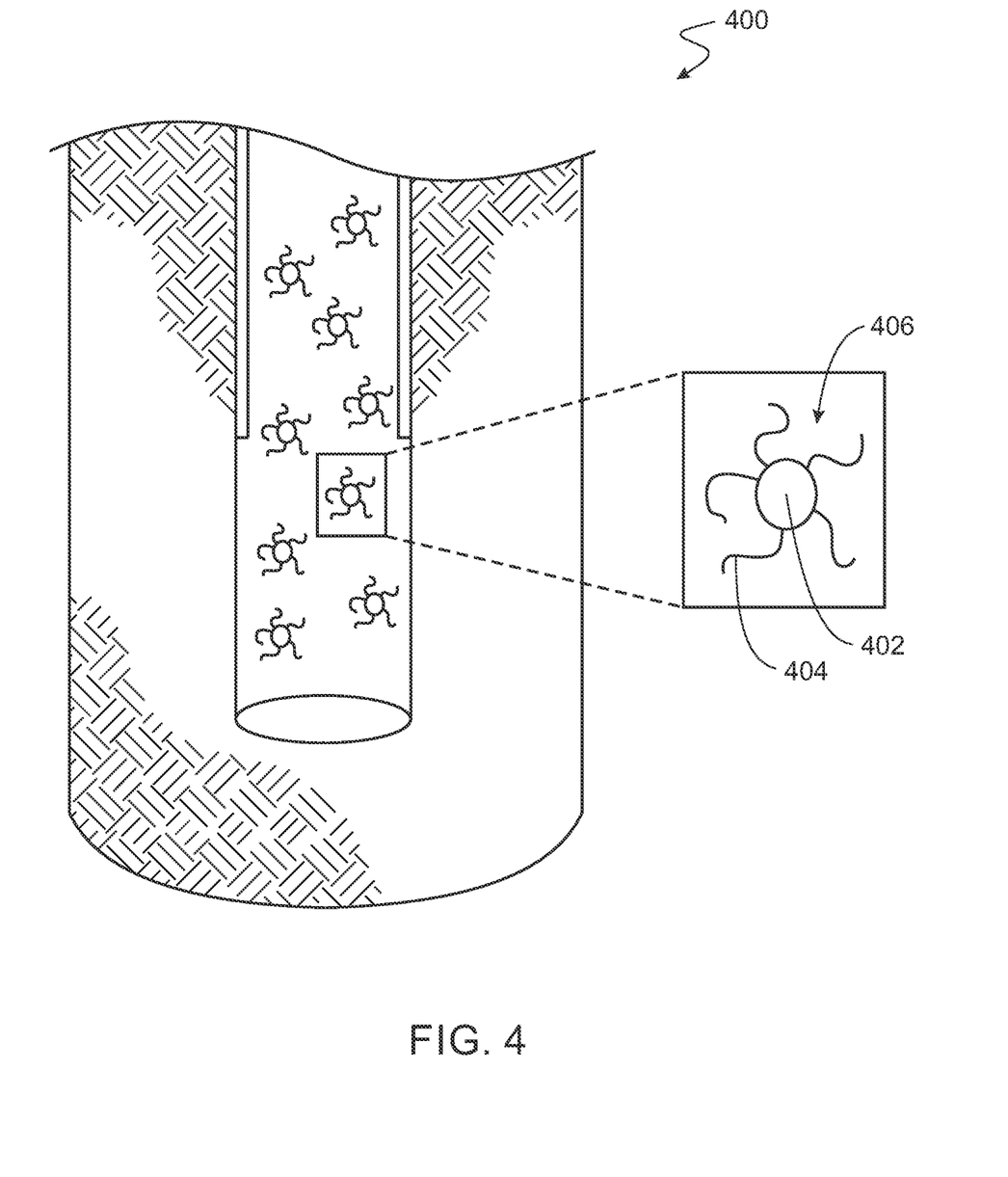
FIG. 4 is a schematic illustration of a sequestration operation with an aqueous amino acid salt solution injected together as an emulsion with carbon dioxide into a subterranean zone.

In some embodiments, the treatment composition and the carbon dioxide are injected simultaneously as an emulsion. FIG. 4 is a schematic illustration of a sequestration operation 400 (which can be the same or similar as operation 10 of FIG. 1) including an aqueous amino acid salt solution 402 with a surfactant 404 injected together as an emulsion with carbon dioxide 406. In some embodiments, the total volume of all fluids injected into the subterranean zone in the form of an emulsion comprises, on average per well per month, less than thirty weight percent water (with dissolved amino acid salts), greater than seventy weight percent carbon dioxide, and from less than 0.05% to 5% weight percent surfactant.

Figure 5:
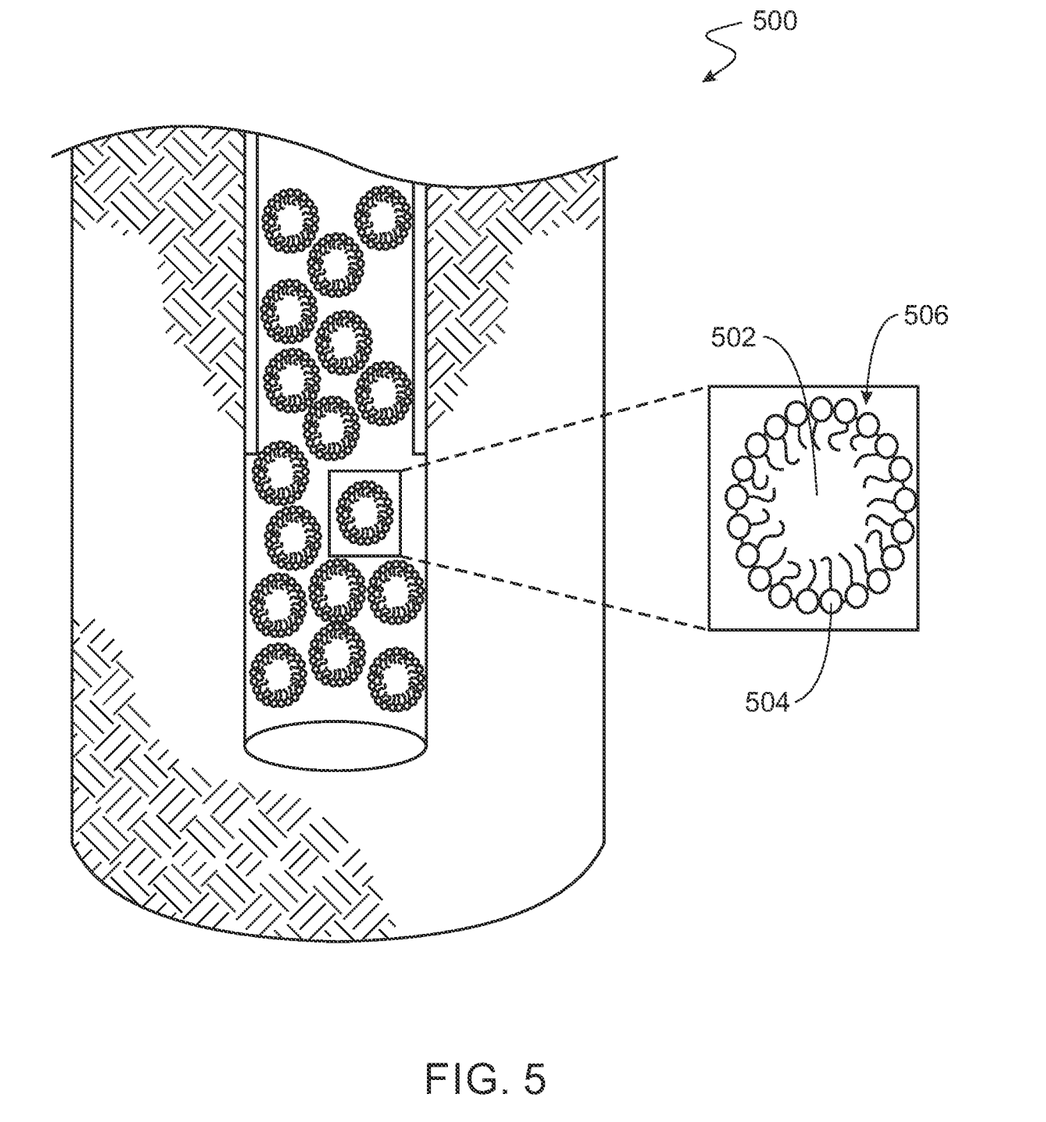
FIG. 5 is a schematic illustration of a sequestration operation with a foam mixture of carbon dioxide injected with an aqueous amino acid salt solution into a subterranean zone.

In some embodiments, the treatment composition and the carbon dioxide are injected simultaneously as a foam mixture. FIG. 5 is a schematic illustration of a sequestration operation 500 (which can be the same or similar as operation 10 of FIG. 1) including a foam mixture of carbon dioxide 502 and surfactant 504 within an aqueous amino acid salt solution 506. In some embodiments, the total volume of all fluids injected into the subterranean zone as a foam mixture comprises, on average per well per month, less than fifty weight percent water (with dissolved amino acid salts), greater than fifty weight percent carbon dioxide, and from less than 0.05% to 5% weight percent surfactant.

The rapid mineralization of carbon using the methods presented herein can be tested on various geological minerals (calcium oxide/hydroxide, gypsum, magnesium oxide/hydroxide, sandstone, silicates etc.). A facile methodology can be adopted to screen the enhanced carbonation in the presence of chemical moieties under well bore conditions. The experiments on the various substrates can be carried out with and without accelerators to demonstrate effectiveness of micelle formation and time required for mineralization. The effect of accelerator on the precipitation of calcium carbonate can be characterized through Fourier transform infrared spectroscopy (FT-IR), X-ray diffraction (XRD), and thermogravimetric analysis (TGA). The changes in the mass of the substrate that undergo treatment can be recorded at various temperatures, pressure, and time intervals. The following is a description of such a characterization:

For a control sample ("Control"), 1.82 g of sandstone rock sample was loaded in a reaction vessel. Aqueous CaCl$_2$ solution (10% w/w in water) was added into the vessel. The temperature of the vessel was maintained at 25-30° C. CO$_2$ gas was bubbled through this solution at 5 mL/min for 45 minutes. The sandstone powder was filtered and dried at 110° C. The final weight of the sample was recorded as 1.80 g.

For a first experimental sample ("Sample A"), 1.82 g of sandstone rock sample was loaded in a reaction vessel. CaCl$_2$-rich solution (2.5% w/w in water) was added into the vessel. Potassium glycinate (0.27 g, 2.4 mmol) was dissolved in this solution. The temperature of the vessel was maintained at 25-30° C. CO$_2$ gas was bubbled through this solution at 5 mL/min for 45 minutes. The sandstone powder was filtered and dried at 110° C. The final weight of the sample was recorded as 1.95 g (7.1% wt. increase).

For a second experimental sample ("Sample B"), 1.82 g of sandstone rock sample was loaded in reaction vessel. CaCl$_2$-rich solution (10% w/w in water) is added into the vessel. Potassium glycinate (1.1 g, 10 mmol) was dissolved in this solution. The temperature of the vessel was maintained at 25-30° C. CO$_2$ gas was bubbled through this solution at 5 mL/min for 45 minutes. The sandstone powder was filtered and dried at 110° C. The final weight of the sample was recorded as 2.25 g (23.6% wt. increase).

Figure 6:
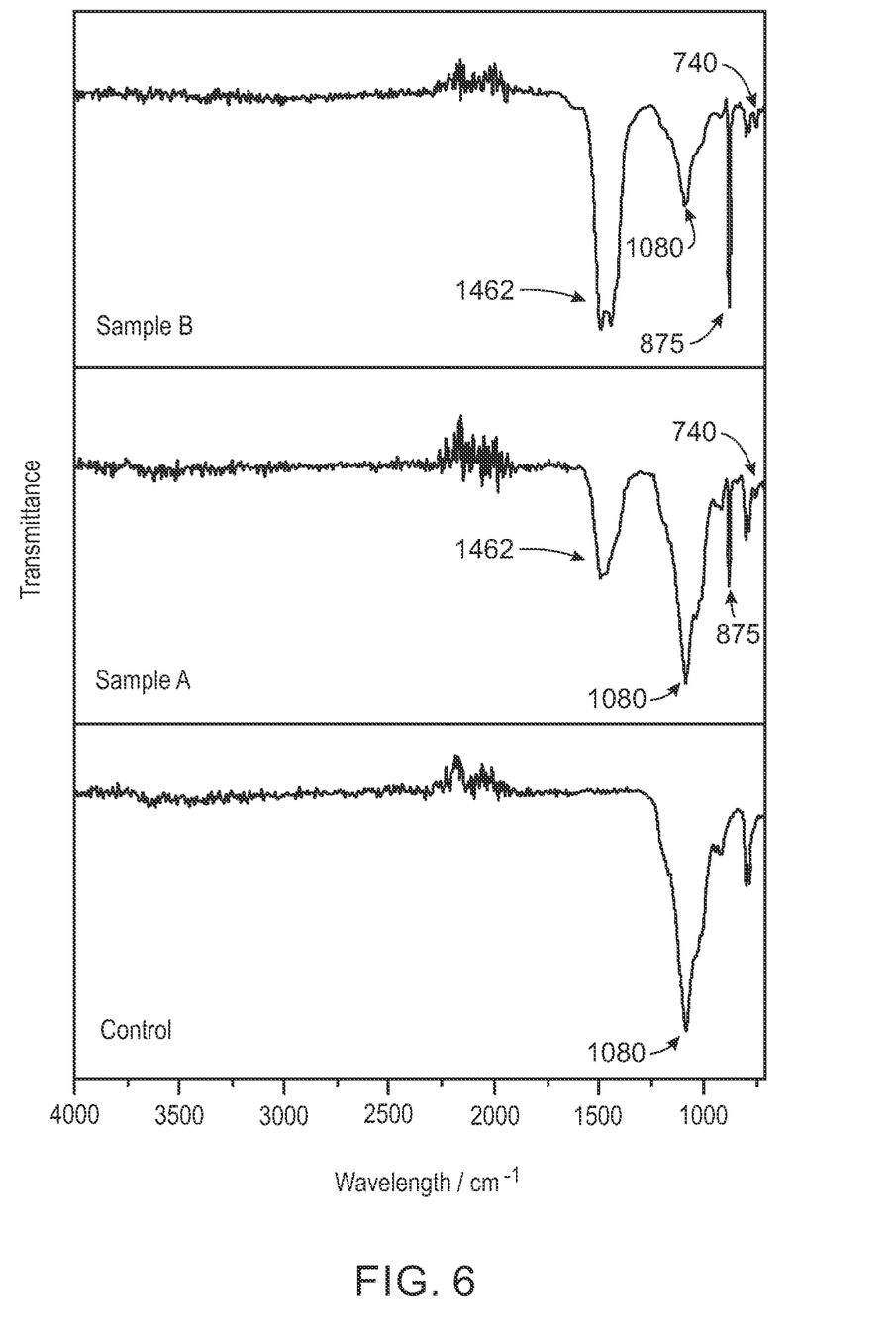
FIG. 6 shows Fourier-transform infrared spectra of experimental samples in accordance with an embodiment of the present disclosure.

FIG. 6 shows FT-IR spectra of Control, Sample A, and Sample B. The FT-IR spectroscopy was carried out on the samples between 600-4000 cm$^{-1}$ on Agilent's Cary 630 instrument. The FT-IR analysis of the Sample A and Sample B show peaks at 1462, 875 and 740 cm$^{-1}$, which is assigned to the characteristic vibration for —CO$_3$ in calcium carbonate. A peak at 1080 cm$^{-1}$ is correspond to the Si—O—Si stretching vibration for sandstone. Control does not show any characteristic peaks for calcium carbonate that suggest the accelerator has facilitated formation of calcium carbonate in Sample A and Sample B.

Figure 7:
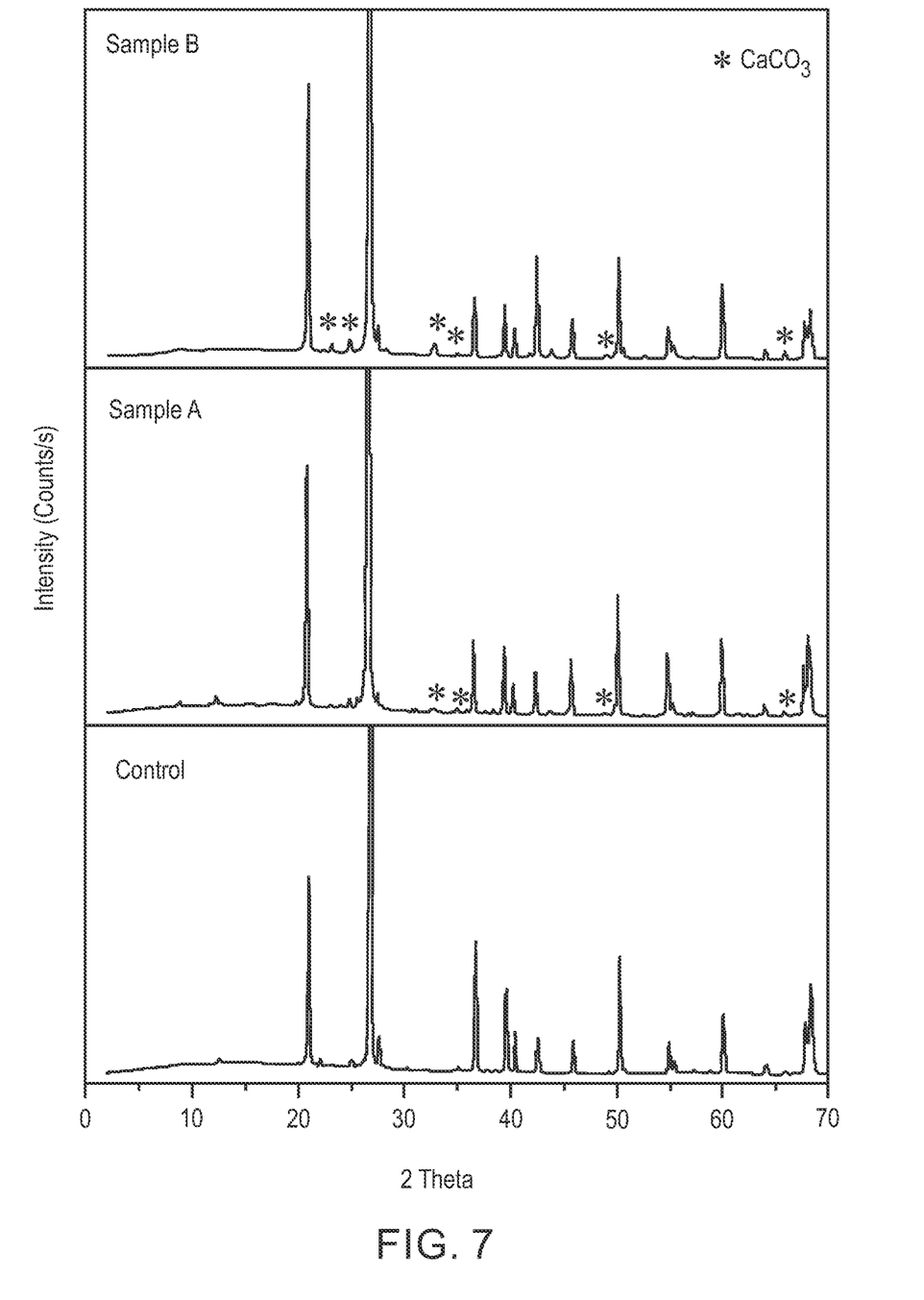
FIG. 7 shows X-ray diffraction analysis of experimental samples in accordance with an embodiment of the present disclosure.

FIG. 7 shows XRD analysis of Control, Sample A, and Sample B. Powder XRD patterns were recorded by Rigaku benchtop Miniflex 600, equipped with monochromatic X-ray source (600 W) and a D/teX Ultra 1D silicon strip detector. The formation of calcium carbonate can be clearly observed upon accelerator treatment in Sample A and Sample B. The diffraction peaks at 23, 24.3, 32.8, 35.1, 49, and 65.7 for Sample A and Sample B is correspond to characteristics of calcium carbonate.

Figure 8:
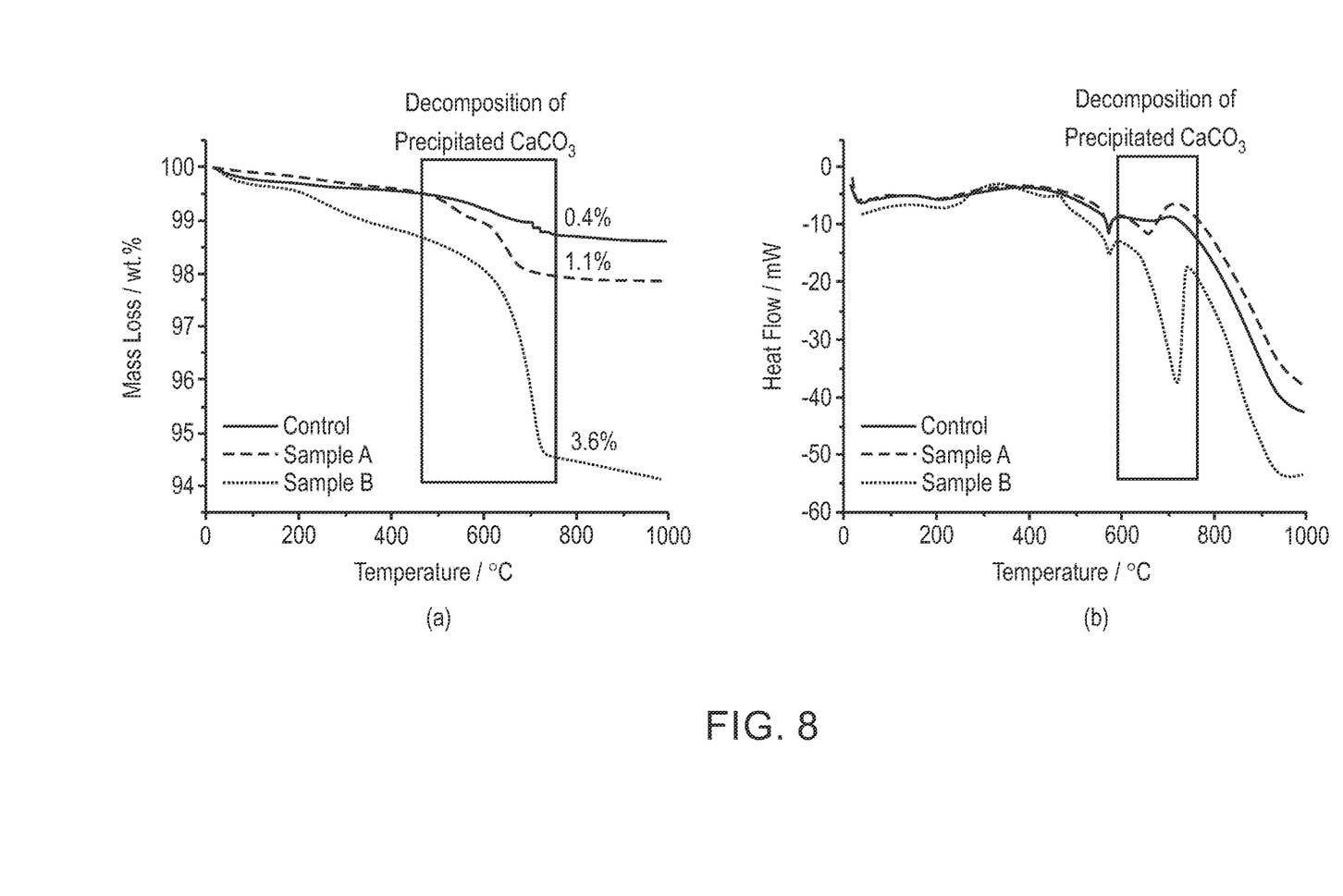
FIG. 8 shows thermogravimetric analysis and heat flow characteristics of experimental samples in accordance with an embodiment of the present disclosure.

FIG. 8 shows (a) TGA and (b) heat flow characteristics of Control, Sample A and Sample B. The TGA and heat flow characteristic analysis was recorded on the TA instrument's SDT q600. The samples were subjected to heat up to 1000° C. with a 10° C./min heating rate under the flow of N2 gas (50 mL/min). In order to determine the formation of calcium carbonate or precipitation of calcium carbonates on sandstone substrate upon accelerator treatment, mass loss patterns, and heat flow characteristics were measured as shown in (a) and (b). The initial mass loss is associated with the adsorbed water up to 120° C. Sample A and Sample B have also shown mass loss between 200-400° C., which could be ascribed to the strongly bound or structural water molecules in calcium carbonates. The decomposition of calcium carbonate occurs between 600-750° C. and the Sample B demonstrated highest mass loss in this temperature range.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

As used in this disclosure, the term "subterranean material" or "subterranean zone" refers to any material under the surface of the earth, including under the surface of the bottom of the ocean. For example, a subterranean zone or material can be any section of a wellbore and any section of a geological formation or region in fluid contact with the wellbore.

A number of implementations of the disclosure have been described. Nevertheless, it will be understood that various modifications may be made without departing from the spirit and scope of the disclosure.

What is claimed is:

1. A method for subsurface sequestration of carbon, the method comprising:
   injecting, into a subterranean zone at least partially saturated with saline water, a treatment composition comprising a mineralization accelerant
   injecting carbon in the form of carbon dioxide into the subterranean zone; the carbon dioxide reacting in the subterranean zone with the mineralization accelerant to form bicarbonate; and
   sequestering at least a portion of the carbon in the subterranean zone by precipitation in the subterranean zone of a carbonate mineral formed from reaction in the subterranean zone of the bicarbonate with metal cations dissolved in the saline water.

2. The method of claim 1, wherein the mineralization accelerant comprises one or more of:
   an amino acid;
   a sodium salt of an amino acid;
   a potassium salt of an amino acid;
   an alkyl amine;
   an aromatic amine.

3. The method of claim 1, wherein the treatment composition is an aqueous solution.

4. The method of claim 3, wherein a concentration of the mineralization accelerant in the aqueous solution is equal to or greater than 0.1 percent weight-for-weight.

5. The method of claim 3, wherein the concentration of the mineralization accelerant in the aqueous solution is equal to or greater than 0.5 percent weight-for-weight.

6. The method of claim 3, wherein the concentration of the mineralization accelerant in the aqueous solution is equal to or greater than one percent weight-for-weight.

7. The method of claim 1, wherein the mineralization accelerant, when injected into the subterranean zone, forms micelles dispersed within the saline water.

8. The method of claim 1, wherein the treatment composition and the carbon dioxide are injected simultaneously as a mixture.

9. The method of claim 1, wherein the treatment composition and the carbon dioxide are injected sequentially.

10. The method of claim 1, wherein treatment composition and the carbon dioxide are injected in alternating aliquots.

11. The method of claim 1, wherein the carbon dioxide is injected into the subterranean zone as a supercritical fluid.

12. The method of claim 1, wherein the carbon dioxide is injected into the subterranean zone as a component of an aqueous solution.

13. The method of claim 1, wherein the saline water has a salinity of greater than 1 percent.

14. The method of claim 1, wherein the subterranean zone comprises a sedimentary rock.

15. The method of claim 1, wherein the treatment composition and the carbon dioxide are injected simultaneously as an emulsion.

16. The method of claim 1, wherein the injecting of carbon dioxide into the subterranean zone is via one or a plurality of wells, and wherein a total volume of all fluids injected into the subterranean zone via the one or the plurality of wells comprises, on average per well per month, at least seventy weight percent carbon dioxide and less than thirty weight percent water.

17. The method of claim 1, wherein the treatment composition and the carbon dioxide are injected simultaneously as a foam mixture.

18. The method of claim 1, wherein the injecting of carbon dioxide into the subterranean zone is at least in part as a via one or a plurality of wells, and wherein a total volume of all fluids injected into the subterranean zone via the one or the plurality of wells comprises, on average per well per month, at least fifty weight percent carbon dioxide and less than fifty weight percent water.

* * * * *